Feb. 22, 1949. W. A. HYLAND 2,462,641
FIELD CULTIVATOR
Filed July 7, 1944 4 Sheets-Sheet 1
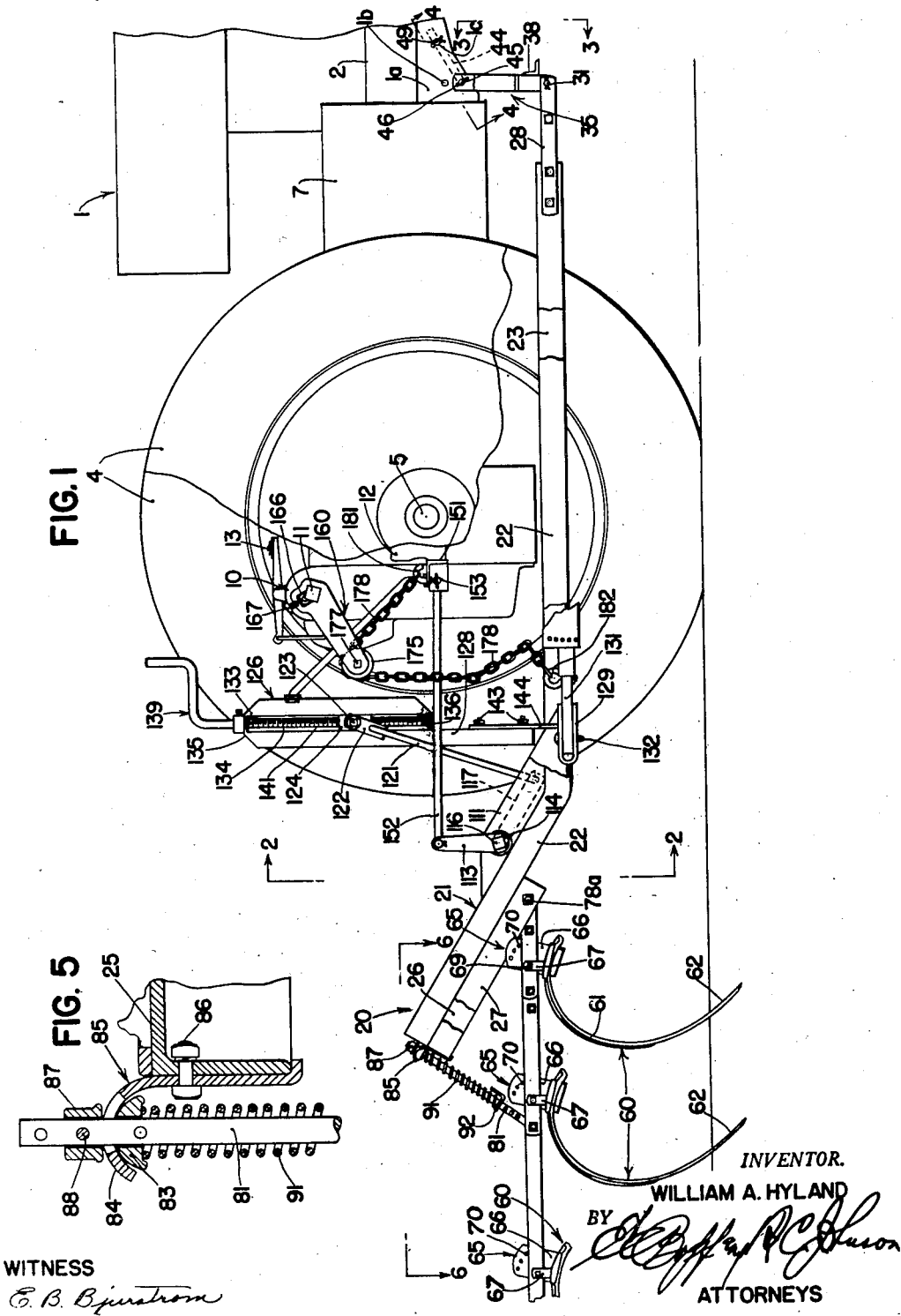
INVENTOR.
WILLIAM A. HYLAND
BY
ATTORNEYS
WITNESS

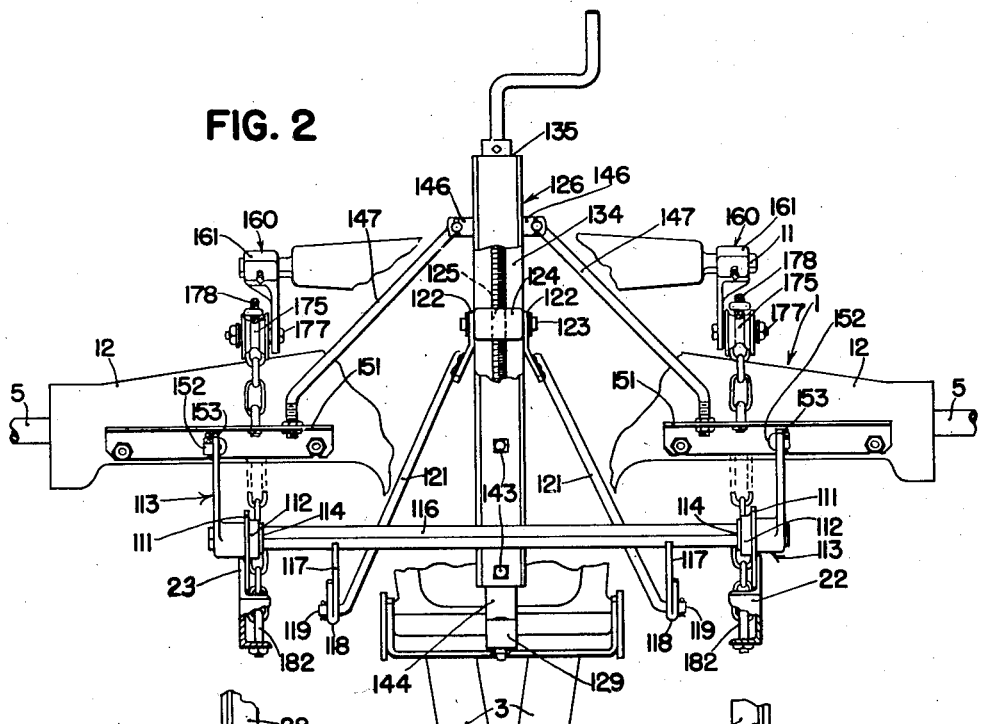
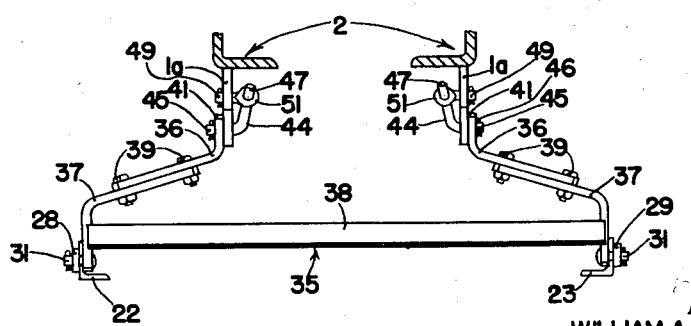

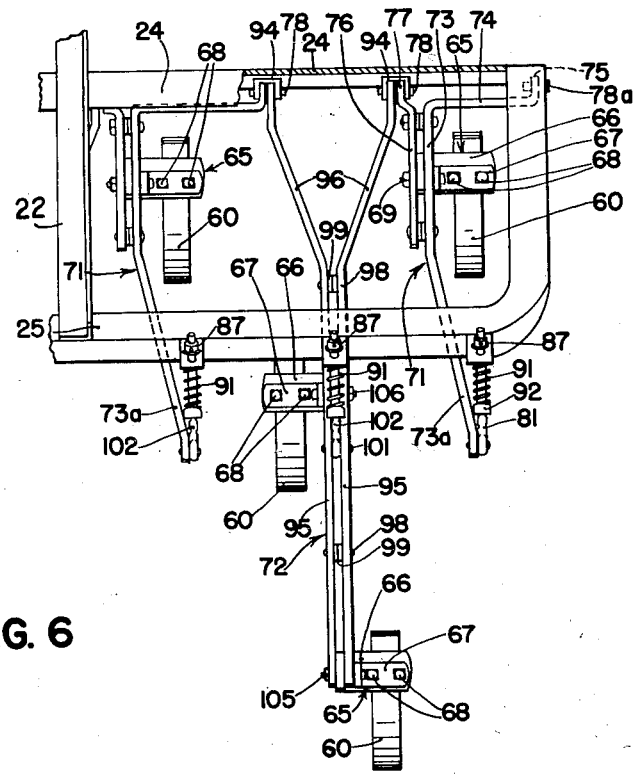
FIG. 6
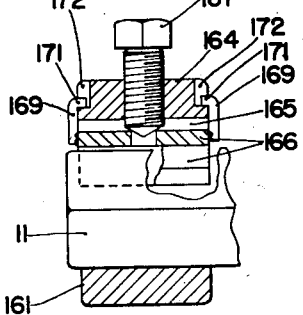
FIG. 8
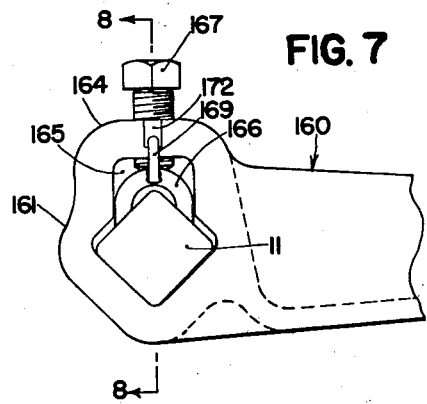
FIG. 7

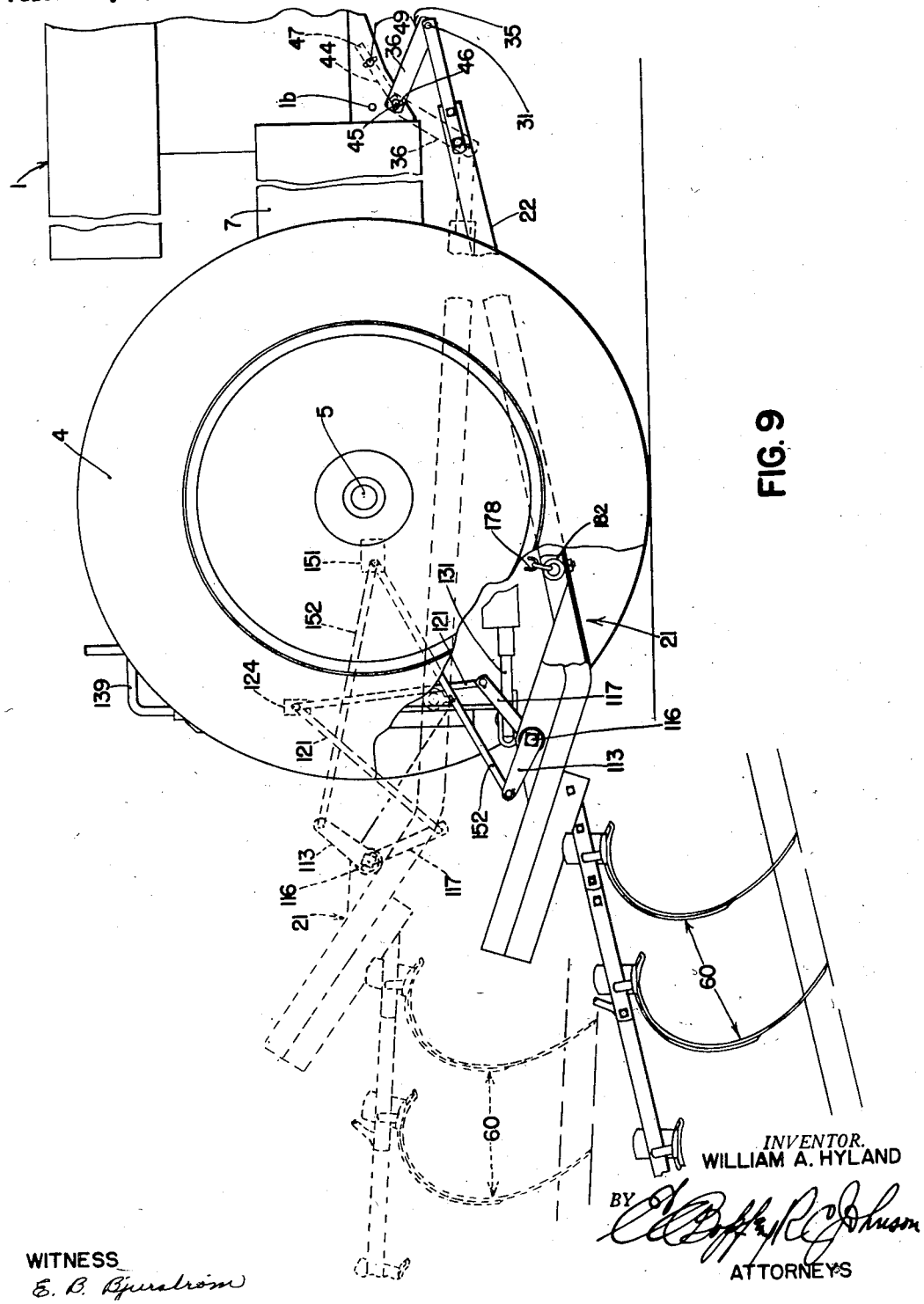

Patented Feb. 22, 1949

2,462,641

UNITED STATES PATENT OFFICE 2,462,641

FIELD CULTIVATOR

William A. Hyland, Horicon, Wis., assignor to John Deere Van Brunt Company, a corporation of Wisconsin Application July 7, 1944, Serial No. 543,809

16 Claims. (Cl. 97—47)

The present invention relates generally to agricultural implements and more particularly to a tractor mounted field cultivator of the integral or semi-integral type.

The object and general nature of the present invention may be said to be the provision of an agricultural implement of this kind wherein the tools maintain a substantially constant depth of operation even when the field is rough or rolling and the outfit is required to pass over relatively sharp ridges and relatively deep depressions. More specifically, it is a feature of this invention to provide an implement in which the tools, connected with the tractor in substantially trailing relation, are caused to remain substantially level with the surface of the ground at all times, even though the front end of the tractor may tip downwardly or be raised upwardly, as when passing over uneven terrain. Particularly, it is a feature of this invention to provide a ground working implement having a relatively rigid frame and so connected that the front end of the frame is, in effect, raised when the front end of the tractor is tipped downwardly, and vice-versa.

Another important feature of the present invention is the provision of a tractor-propelled agricultural implement wherein the draft pull is, in effect, balanced against the weight of the implement and/or the weight and suck of the ground working tools. Further, it is another feature of this invention to provide a draft connection between an implement and its propelling tractor such that when the rear portion of the implement, such as the part rearwardly of the tractor rear wheels, falls, relative to the tractor, the front end of the implement is raised relative to the tractor. By virtue of this particular construction, the passage of the outfit over ridges and depressions does not materially affect the constant or uniform working of the implement.

An additional feature of this invention is the provision of a tractor mounted implement, such as a field cultivator, in which an even depth of cultivation is maintained in substantially all land conditions but without the use of gauge wheels.

These and other objects and advantages of the present invention will be apparent to those skilled in the art after a consideration of the following detailed description, taken in conjunction with the accompanying drawings in which the preferred form of the present invention has been shown by way of illustration.

In the drawings:

Figure 1 is a side view of the complete outfit, showing the cultivator attached to the platform in normal operating relation, as when passing over substantially level land.

Figure 2 is a rear view, taken generally along the line 2—2 of Figure 1 and showing in particular the depth adjusting mechanism carried by the tractor.

Figure 3 is a section taken generally along the line 3—3 of Figure 1, showing in particular the swinging hitch connection between the front end of the implement and the tractor.

Figure 4 is a section taken generally along the line 4—4 of Figure 1 showing certain details of the quick detachable connection for the front end hitch structure.

Figure 5 is a detail view of one of the spring connections between the drag bars of the cultivator and the cultivator frame.

Figure 6 is a plan view of a portion of the cultivator taken generally along the line 6—6 of Figure 1, showing certain details of the drag beams and the manner of attaching the tools and pressure rods thereto.

Figure 7 is a fragmentary view showing the lifting arm and the manner of its attachment to the tractor power lift rockshaft.

Figure 8 is a section taken along the line 8—8 of Figure 7.

Figure 9 is a side view similar to Figure 1, showing the manner in which the cultivator swings with respect to the tractor.

Referring now to the drawings, more particularly to Figures 1-3, the tractor, indicated in its entirety by the reference numeral 1 is, so far as the present invention is concerned, conventional, incorporating a frame 2 supported on a pair of closely spaced front wheels 3 and relatively widely spaced rear wheels 4 fixed to axles 5. The tractor 1 includes a motor 7 from which power is derived for operating a power lift, indicated in its entirety by the reference numeral 10 and which includes a transverse power lift rockshaft 11. The axles 5 are supported in a suitable rear axle construction 12 on which the power lift unit 10 is mounted. The power lift is controlled by any suitable means, such as a valve lever 13.

The cultivator which has been chosen to illustrate the present invention, is shown as a spring tooth field cultivator and is indicated in its entirety by the reference numeral 20. The cultivator 20 incorporates a frame 21 which is made up of right and left hand generally longitudinally extending frame bars 22 and 23 and to the rear upwardly extending portions are secured front and rear transversely extending frame angles 24 and 25. These members may be welded or bolted, as desired, to the rear upwardly angled portions of the longitudinal frame bars 22 and 23, and preferably the rear frame angle 25 includes forwardly bent end sections 26 and 27 to which the laterally outer ends of the front frame angle 24 are secured in any suitable way. A pair of strap members 28 and 29 are bolted or otherwise secured to the front ends of the longitudinal frame angles 22 and 23, and the forward ends of the strap members 28 and 29 are apertured to receive pivot members 31. The pivot members 31 are carried by a swinging link hitch structure indicated in its entirety by the reference numeral 35. The swinging link hitch structure comprises right and left hand pairs of angled strap members 36 and 37, the strap members 37 being rigidly connected together by a tie angle 38 which preferably is welded to the lower portions of the strap members 37, these portions being apertured to receive the pivot members 31. The overlapping angled sections of the strap members 36 and 37 are provided with a plurality of openings to receive bolts 39 so that by disposing the bolts in different openings the lateral spacing between the upturned or inner ends 41 of the strap members 36, tractors having different widths may be accommodated.

The frame of the tractor 1 is normally provided with one or more attaching holes to receive different implements, and according to the present invention the swinging link hitch structure 35 is pivotally connected to this portion of the tractor by new and improved means which is so constructed and arranged as to take all wear due to the swinging action of the hitch structure without imposing such wear onto the apertured portions of the tractor frame. Referring now more particularly to Figure 4, the apertured portion of the tractor frame is indicated by the reference numeral 1a and the upper apertured end 41 of the hitch link 36 is adapted to register therewith. Other apertures in the frame of the tractor are indicated at 1b, 1c, etc., for convenience in attaching different implements thereto. I make use of this structure to provide a hitch connection with a tractor that not only is quick detachable but, as mentioned above, is so constructed and arranged to take the wear of the swinging of the hitch structure rather than imposing such wear on the tractor. To this end I provide an L-shaped pivot pin 44 for each side of the tractor, each pin including a section 45 that passes through the hole in the tractor frame and the opening in the upper end of the hitch strap 36. A spring type hitch pin lock 46 passes through an opening in the outer end of the pin section 45 to hold the hitch strap member 36 in place. The other end of the pivot pin 44 is indicated at 47 and passes through a sliding pin 49. The sliding pin 49 includes an eye section 51 through which the end 47 of the pin 44 passes, and a straight section 52 which extends through the opening 1b in the tractor frame. A cotter 53 or a spring type hitch pin lock is provided for holding the sliding pin in place. It will be seen that by virtue of the pin 49 the member 44 is prevented from rotating when the hitch structure 35 swings. Therefore, the latter is constrained to swing on the ends 45 of the right and left pivot pins 44 so that the latter member will take all the wear and there is practically no wear on the tractor frame openings 1a. It is, however, relatively easy to detach the hitch 35, merely by removing the hitch pin locks 46 and 53, whereupon the members 44 and 52 may readily be disconnected. Since the member 52 may be disposed on the section 47 of the member 44 in almost any position along the length thereof, it will be seen that the two parts of the hitch pivot structure may thus be connected to tractors having different hole spacings.

Three rows of spring teeth are provided, each spring tooth being indicated by the reference numeral 60. Each spring tooth 60 includes a spring shank 61 and a shovel or tooth 62 secured to the shank by plow bolts or the like. A bracket structure, indicated in its entirety by the reference numeral 65, is clamped to the upper end of each spring shank 61, and each bracket structure 65 comprises outer and inner L-shaped clamping members 66 and 67, suitably apertured to receive a pair of clamping bolts 68 spaced apart a distance sufficient to receive the upper end of the spring shank 61 therebetween. The upper end of the outer bracket member 66 is provided with a plurality of apertures to receive a break pin 70, and also, each bracket 66 is apertured, as well as the inner bracket 67, to receive a transverse bolt 69 by which the spring tooth 60 is attached to the associated drag bar, the position of the tooth being adjusted by disposing the break pin 70 in one or the other of the openings in the bracket section 66 above referred to. All of the cultivator teeth are as described above, but there are two kinds of drag bars connecting the teeth to the cultivator frame, namely, a plurality of short drag bars 71, to each of which one cultivator tooth 60 is attached, and a plurality of long drag bars 72 to each of which two cultivator teeth 60 are attached. Referring first to the short drag bars 71, it will be seen from Figure 6 that each short drag bar 71 comprises a relatively long strap member 73 having a laterally directed section 74, which terminates in a forwardly directed apertured lug section 75. The short drag bar 71 also includes a strap member 76 also having a forwardly directed apertured lug section 77. The strap member 76 is bolted or riveted to the other strap section 73 with spacers therebetween, and is apertured to receive a pivot bolt 78 by which the forward end is pivoted to a clip 94.

The forward end 75 of the right hand member 73 is pivoted by a bolt 78a to the frame bar 27. It will be noted that the bracket structure 65 provides an offset connection and the parts are so assembled that by virtue of this offset bracket structure, each spring shank is disposed in line with a pressure rod 81 that is pivoted to the rear extended section 73a of the strap member 73. This pressure rod 81 extends generally upwardly and passes through a semi-spherical swivel member 83, through the upper slotted and rounded end 84 of a swivel clip 85 that is fixed, as at 86, to the rear frame bar 25, and through a collar 87 that is fixed, preferably adjustably, to the upper end of the pressure rod 81 by a cotter 88 or the like. A pressure spring 91 is mounted about the pressure rod 81 below the clip 85. The spring 91 bears at its upper end against the semi-spherical swivel 83 and at its lower end against a clip 92 that may be anchored to the lower portion of the pressure rod 81 in different positions of adjustment. The forward apertured lugs 75 and 77 of the short drag bar 71 are pivotally connected to the front frame angle 24 by a pair of clips 94. It will also be seen from Figure 6 that there are a plurality of the short drag bars 71 alternated with the long drag bars 72.

As mentioned above, the long drag bars 72 are alternated with the short drag bars 71. Each of the long drag bars 72 comprises preferably identical strap members 95, each having a straight rear section and a laterally offset forward section 96 that is apertured, to receive pivot bolts or rivets 78 by which the long drag bar 72 is pivoted, as by the clips 94, to the front frame angle 24. The straight sections of the two strap members 95 making up one long drag bar 72 are connected together in spaced apart relation by suitable rivets and spacers 98 and 99. The strap members 95 are also apertured to receive a rivet 101 on which the lower end of a pressure rod 102 is loosely pivoted. The pressure rod 102 may be identical with the pressure rod 81 described above. Likewise, each pressure rod 102 is connected with the cultivator frame in the same manner as described above for the pressure rods 81, and the same reference numerals have been utilized to indicate identical parts. Two cultivator teeth 60 are connected to each of the long drag bars 72. This is accomplished by connecting the bracket structures 65 to the spring members 61 so that some extend or are offset to the right while others extend or are offset to the left. Then a pair of cultivator spring teeth 60, one with a right-hand offset bracket structure and the other with a left-hand offset bracket structure are connected to each long drag bar 72. Such connection is effected by a rear pivot bolt 105 and a forward pivot bolt 106.

Secured, as by welding or the like, to each of the longitudinal frame bars 22 and 23, preferably to the upwardly angled sections thereof, is a rockshaft bearing bracket 111. Each bracket 111 is provided with a punched bearing section 112 which rockably receives an arm 113 having a sleeve section 114 that is journaled for rocking movement in the bearing section 112. The two arms 113 have square apertures in their sleeve sections to receive a square shaft 116 which is thus mounted for rocking movement on the cultivator frame. Any suitable means, such as set screws or the like, may be provided for fixing the arms 113 to the rockshaft 116 to hold the arms against lateral displacement so that the arms then cooperate with the brackets 111 to maintain the rockshaft 116 in position against lateral displacement relative to the cultivator frame. The central portion of the rockshaft 116 has a pair of arms 117 secured thereto, preferably by welding. The forward section of each of the arms 117 is folded over to present a thickened apertured portion 118 to which the lower laterally turned end 119 of a generally downwardly extending link 121 is pivotally connected. The two links 121 are in the nature of tension rods and extend not only upwardly but laterally inwardly and are welded or otherwise fixed to an apertured strap section 122. The two apertured sections 122 are pivoted to a pin 123 carried by an adjusting block 124. The adjusting block 124 is provided with a vertical tapped opening 125 and is shiftable generally vertically in a guide structure 126 carried in more or less fixed relation on the tractor 1. The guide structure 126 comprises a vertical channel 128 having a U-shaped yoke 129 welded to the lower end thereof and shaped to receive the drawbar 131 of the tractor. The yoke 129 is apertured, as is the tractor drawbar 131, so that a pin or bolt 132 serves to fix the lower end of the guide structure 126 to the tractor. The flanges of the channel 128 are interrupted so that the upper portion of the channel may be bent downwardly, as indicated at 133, to form a space or slot 134 in which the adjusting block 124 may move. The channel is so formed that the upper and lower ends of the slot 134 are closed, as indicated at 135 and 136, the sections 135 and 136 being apertured to receive an adjusting crank 139. The crank 139 is retained for rotation but held against lateral displacement in the guide structure 126 and the portion of the crank between the upper and lower ends of the slot 134 is screw threaded, as indicated at 141, so that by turning the crank 139 in one direction or the other, the adjusting block may be run upwardly or downwardly in the slot 134. Preferably, the lower end of the channel 128 is secured to the yoke 129 by bolts 143 which pass through the channel 128 and through a plate 144 that is secured to the yoke 129, as by being welded thereto. A laterally extending lug 146 is fixed to each side of the channel 128 and serves to receive the rear and laterally inwardly disposed ends of a pair of brace rods 147, the outer ends of which are connected to brackets 151 that, in turn, are bolted to the rear axle structure of the tractor. Thus, the guide structure 126 is rigidly and fixedly carried by the tractor. The upper ends of the arms 113 are connected by draft links 152 which extend generally horizontally and at their forward ends are pivotally connected to apertured lugs 153 formed on or carried by the brackets 151. It is to be noted that the arms 113, the rockshaft 116, and the arms 117 constitute, in effect, a bell crank having one arm thereof connected through substantially vertically extending links with a part of the tractor rearwardly of the rear axle structure thereof while the other arm of the bell crank is connected through a generally horizontally extending link with the tractor forwardly of the first point of connection, and that the cultivator, the frame of which is generally rigid, is free to swing generally vertically relative to the tractor since such free swinging movement is accommodated by rocking movement of the bell crank structure 113, 116, 117. However, the swinging of the bell crank structure when the cultivator moves upwardly or downwardly relative to the tractor results in longitudinal shifting of the entire cultivator relative to the tractor, but this shifting movement is accommodated by virtue of the swinging hitch connection 35. The effect of these movements will be described in more detail below when the operation of the implement is set forth.

The tractor power lift rockshaft 11 is provided with a pair of lift arms each of which is indicated in its entirety by the reference numeral 160. Each arm 160 includes a hub section 161 formed with a squared opening to receive the square end of the tractor power lift rockshaft 11. The hub section 161 of the arm 160 is extended, as at 164, to form a space 165 in which a clamping yoke 166 is disposed. The yoke 166 is formed as a saddle member extending the length of the hub section 161 and having portions adapted to engage the rockshaft 11. The yoke 166 is slidable in the space 165 and may be advanced toward the rockshaft 11 by an adjusting set screw 167. The ends of the yoke 166 have guide fingers 169 secured thereto, as by welding, and the upper ends of the fingers 169 are turned laterally inwardly, as at 171, and move in slots 172 formed in the upper extended portion 164 of the lift arm hub 161. The outer end of each lift arm 160 receives a pulley 175 mounted for rotation on a bushing held in place in the arm 160 by a bolt 177. A chain 178 passes over each of the pulleys 175, and each chain is anchored at one end by a hook 181 to a portion of the tractor while the other end of the chain extends downwardly and is connected to the cultivator frame by an eyebolt 182. Normally, the power lift rockshaft 11 rocks through an operative angle of approximately sixty degrees, and the length of the two chains 178 are such that when the arms 160 are in the downward position, the chains 178 are slack, permitting the vertical floating movement of the implement referred to above, but when the rockshaft 11 is rocked in a direction to raise the arms 160, the chains 178 are tightened and the implement then raised into its transport position with the teeth 60 entirely out of contact with the ground. It is to be noted that, after the chains 178 are tight, the implement is lifted at approximately twice the amount of upward movement of the outer ends of the lift arms 160.

The operation of the field cultivator described above is substantially as follows.

Figure 1 shows the outfit in normal working position at an average depth. The forward pull of the tractor against the implement is transmitted thereto through the draft links 152 which, by virtue of the tension links 121, react against the weight of the implement in transmitting draft to the latter, with the swinging front hitch 35 serving mainly as a guide for the front end of the frame. That is, the forward pull tends to rotate the bell crank 113, 117 in a clockwise direction, thus reacting against the rear portion of the tractor and tending to raise the rear end of the implement. This is opposed not only by the weight of the implement but also by the suction of the tools. By referring to Figure 1 it will be noted that in the normal position of the implement frame, the forward swinging hitch link structure 35 hangs generally downwardly from the points 45 at which it is connected with the tractor. If, therefore, the soil resistance against the teeth 60 should increase, this would result in an increase in the draft pull and a clockwise rocking of the bell crank 113, 117, together with a rearward movement of the implement frame. This rearward movement of the implement frame causes a rearward rocking of the lower portion of the hitch structure 35. At the same time the rear end of the frame 21 swings upwardly which, in effect, causes the teeth to run somewhat shallower. On the other hand, if there should be a tendency for the tools to run too shallow, the reduced soil pressure permits the weight of the frame and the tool suction to cause the bell crank 113, 117 to move counterclockwise, which shifts the frame 21 downwardly, thus increasing the depth of operation. In this way, where soil conditions are fairly constant, a very uniform working of the ground is accomplished because at all times the weight and suction of the tools are balanced against the draft pull and any change in the magnitude of either causes the frame to shift the tools into a deeper or more shallow position so as to restore equilibrium.

Reference was made above to the fact that the rear end of the implement frame is free for generally vertical floating movement relative to the tractor. This enables the outfit to travel over quite uneven terrain while, at the same time, working it to a substantially constant depth even though the outfit crosses relatively high ridges and relatively deep depressions. The draft and hitch linkage connecting the implement with the tractor and described above, secures these advantages in the manner illustrated in Figure 9. As shown, when passing over a ridge, the rear end of the implement will drop down, but as the hitch 35 swings forwardly, in effect the hitch point is raised. Thus, there is an upward pull which, acting through the implement frame, which is a rigid unit, serves to keep the tools, which are in rear of the tractor wheels, working at an even depth, both the front and rear tools penetrating the ground for approximately the same distance. Obviously, the steeper the ridge, the more the implement frame will be shifted forwardly with respect to the tractor, and therefore the higher the front end of the implement, relative to the tractor, will be shifted. On the other hand, when the outfit passes over a depression in the ground, the rear end of the implement will be raised with respect to the tractor which results in a rearward shifting of the implement frame. In this case, the swingable hitch structure 35 swings rearwardly, but the amount of rearward swinging for any given amount of elevation of the rear end of the implement with respect to the tractor is fairly limited so that, in effect, the hitch point, namely, pivots 31, is raised only slightly, but due to the fact that the implement is shifted as a whole rearwardly with respect to the tractor, it is not particularly necessary to lower the hitch point when the rear end of the implement is raised, it being required only that the rearward swinging of the hitch structure 35 occasions nothing more than only a slight raising of the hitch point 31. If desired, the hitch 35 could be arranged so that in normal position (Figure 1), the hitch would extend forwardly at an angle, in which case when the rear end of the implement frame drops downwardly with respect to the tractor the hitch point would be raised and when the rear end of the implement frame is raised with respect to the tractor, the hitch point would be lowered. The structure shown in the drawings has proven by practical tests to provide a substantially constant depth of operation, not only when passing over level ground but also when the tractor is crossing ridges and depressions.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. An agricultural machine comprising the combination with a farm tractor of a field cultivator including a generally fore and aft extending frame having ground working tools at the rear thereof and rearwardly of the rear of the tractor, and mechanism connecting both the front and rear portions of said field cultivator with the tractor, means including a generally fore and aft shiftable connection between the front portion of said frame and said tractor for limiting the generally vertical movement of the front portion of said frame relative to the tractor, a draft transmitting connection between the rear portion of said frame and said tractor, and means connected with said draft transmitting connection and acting against the tractor for raising and lowering the rear portion of said frame in accordance with the magnitude of the draft transmitted by said draft transmitting connection.

2. An agricultural machine comprising the combination with a farm tractor of a field cultivator including a generally fore and aft extending frame having ground working tools at the rear thereof and rearwardly of the rear of the tractor, means serving as a swinging link connecting the front end of the cultivator with the tractor generally forwardly of the rear portion of the tractor, and linkage connecting the rear portion of the cultivator with the rear portion of the tractor and arranged whereby generally vertical movement of the rear portion of the cultivator relative to the tractor shifts the cultivator generally fore and aft said linkage including a part movably mounted on said frame, a generally horizontally extending draft connection from the tractor to said part, and a generally vertically extending lifting connection from said part to the tractor at a point in the upper rear portion thereof.

3. A tractor propelled implement comprising a rigid longitudinally extending tool frame having ground working tools at the rear thereof rearwardly of the tractor, a draft connection between the tractor and the intermediate part of the tool frame and including means acting generally upwardly on said frame and generally downwardly on the tractor and fore and aft shiftable means connecting the front end of said tool frame with the tractor so as to prevent generally vertical movement of the front end of the frame relative to the tractor.

4. An agricultural implement adapted to be connected with a tractor, comprising a rigid fore and aft extending tool frame shiftably connected at its front end for relatively free movement with respect to the tractor, ground engaging tools fixed to the rear end of said tool frame generally rearwardly of the tractor, the rear portion of said tool frame being shiftable generally vertically relative to the tractor, a draft transmitting connection connected at its front end with the tractor, a lifting connection connected at its upper end with the tractor, and means for connecting said connections to the rear portion of said tool frame whereby the rear portion of said frame is raised upon an increase in the amount of draft and lowered upon the occurrence of a decrease in the amount of draft transmitted by said draft transmitting connection.

5. In a farm machine, the combination of a propelling support, ground working tool means connected therewith for both fore and aft and generally vertical movement relative to the propelling support, means for transmitting pulling draft from the propelling support to said tool means, a part movably mounted on said tool means, means connecting one portion of said part with said draft transmitting means, and means for connecting the other portion of said part with said support.

6. In a farm machine, the combination of a propelling support, ground working tool means connected therewith for both fore and aft and generally vertical movement relative to the propelling support, a bell crank pivotally mounted on said tool means and including a generally fore and aft extending arm and a generally vertically extending arm, means for transmitting pulling draft from the propelling support to said vertical arm, and means serving as a generally vertically extending link connecting said generally fore and aft extending arm with said propelling support.

7. In a farm machine, the combination of a propelling support, ground working tool means extending generally longitudinally of said propelling support, means connecting the front portion of said tool means with said propelling support for generally fore and aft shifting movement, a bell crank pivotally mounted on the rear portion of said tool means and including a generally fore and aft extending arm and a generally vertically extending arm, means for transmitting pulling draft from the propelling support to said vertical arm, and means serving as a generally vertically extending link connecting said generally fore and aft extending arm with said propelling support.

8. In a farm machine, the combination of a propelling support, ground working tool means connected therewith for both fore and aft and generally vertical movement relative to the propelling support, a bell crank pivotally mounted on said tool means and including a generally fore and aft extending arm and a generally vertically extending arm, a draft link connecting the vertically extending arm with the propelling support, a second link connected at one end with the other arm, and depth adjusting means adjustably connecting the other end of said second link with said propelling support.

9. The invention set forth in claim 8, further characterized by said depth adjusting means being disposed centrally with respect to the rear portion of said support and said tool means being rockable about an axis extending generally through the connection between said adjusting means and said tool means so as to accommodate passage of the machine over uneven terrain.

10. An agricultural machine comprising a propelled tool support, ground working tool means shiftably connected therewith for movement in a generally fore and aft direction, a part on said tool means rockable about a generally transverse axis, a draft connection between said support and said part and connected to the latter generally at one side of said axis, and a lifting connection connected to said part generally at the other side of said axis and connected to said support, whereby the draft pull transmitted through said draft connection acts against said part and said support tending to lift said tool means.

11. A tractor mounted implement comprising a tool frame having ground working tools fixed to the rear portion thereof, a generally vertically shiftable hitch connection connecting the front end of said tool frame to the tractor forward of the axis of the rear wheels thereof, draft transmitting means connecting the tool frame with the tractor, and means including linkage connected with the tractor rearwardly of the axis of the rear wheels thereof and responsive to downward movement of the rear portion of said tool frame for shifting said hitch connection and raising the front portion of said tool frame.

12. A tractor propelled implement comprising tool beam means extending generally longitudinally of the tractor, means movably connecting the front end of said tool beam means with the tractor, means serving as a bell crank rockably mounted on the rear portion of said tool beam means, tool position determining means connected with one arm of said bell crank means, and a draft transmitting link connecting the other arm of said bell crank means with the tractor whereby any generally longitudinal movement of said tool frame means relative to the tractor results in a change in the position of the rear portion of said tool frame means in a generally vertical direction relative to the tractor.

13. An attachment for tractors comprising a tool frame, a generally fore and aft swingable link connecting the front end of said frame to the tractor, a generally horizontally disposed draft member connected at its front end with the tractor, a lever pivoted on said frame, the rear end of said draft member being connected with one part of said lever, and means connecting another part of said lever with the tractor for balancing the draft pull between the tractor and said frame against the weight of the latter.

14. A draft connection between a tractor and an implement, comprising bell crank means pivotally mounted on the implement, a draft link extending from one bell crank arm generally in a longitudinal direction to the tractor, and a second link extending generally vertically from the other bell crank arm and acting against the tractor to direct the reaction of draft loads transmitted by the draft link against the weight of said implement.

15. A draft connection between a tractor and an implement, comprising bell crank means pivotally mounted on the implement, a draft link extending from one bell crank arm generally in a longitudinal direction to the tractor, a second link extending generally vertically from the other bell crank arm and acting against the tractor to direct the reaction of draft loads transmitted by the draft link against the weight of said implement, and guide means for the front end of the implement carried by the tractor.

16. A draft connection between a tractor and an implement including ground working tools, comprising tool position determining means acting to raise and lower the implement, means serving as a link connected between the tractor and said position determining means and serving as the sole means for applying draft to the implement by reacting through said position determining means against the weight of said implement and tools, and means connecting the front portion of said implement for relatively free longitudinal movement relative to the tractor.

WILLIAM A. HYLAND.

REFERENCES CITED

The following references are of record in the file of this patent:

UNITED STATES PATENTS

| Number | Name | Date |
|---|---|---|
| 1,060,095 | Johnsson | Apr. 29, 1913 |
| 1,501,652 | Ferguson | July 15, 1924 |
| 1,893,619 | Geraldson | Jan. 10, 1933 |

FOREIGN PATENTS

| Number | Country | Date |
|---|---|---|
| 320,070 | Germany | Apr. 9, 1920 |
| 345,077 | Germany | Dec. 5, 1921 |